United States Patent [19]

Imler

[11] 4,150,963

[45] Apr. 24, 1979

[54] METHOD AND APPARATUS FOR RESTRAINING GLASS DURING TEMPERING

[75] Inventor: Vaughn R. Imler, Valencia, Pa.

[73] Assignee: PPG Industries, Inc., Pittsburgh, Pa.

[21] Appl. No.: 883,570

[22] Filed: Mar. 6, 1978

[51] Int. Cl.² ............................................... C03B 27/00
[52] U.S. Cl. ........................................ 65/114; 65/104; 65/348
[58] Field of Search ................. 65/104, 114, 348, 349, 65/350, 351

[56] References Cited

U.S. PATENT DOCUMENTS

| | | | |
|---|---|---|---|
| 2,137,061 | 11/1938 | Quentin | 65/114 |
| 3,089,727 | 5/1963 | Hay, Jr. | 294/118 |
| 3,340,039 | 9/1967 | Marceau | 65/114 X |
| 3,346,360 | 10/1967 | O'Connell et al. | 65/4 X |
| 3,367,764 | 2/1968 | Seymour | 65/291 |
| 3,824,090 | 7/1974 | Seymour et al. | 65/114 |
| 4,006,002 | 2/1977 | Hetman, Jr. | 65/114 |

FOREIGN PATENT DOCUMENTS 505189  5/1939  United Kingdom ............. 65/114

Primary Examiner—Arthur D. Kellogg
Attorney, Agent, or Firm—Dennis G. Millman

[57] ABSTRACT

In tempering glass sheets vertically hung from tongs, the uniformity with which tempering medium is applied onto the glass sheets during quenching is improved by providing the quenching apparatus with a plurality of discs carried on wires on one side of the path taken by glass sheets through the quenching apparatus. The flow of tempering medium is controlled so as to force the glass sheets against the discs, thereby avoiding uncontrolled buffeting of the glass sheets during quenching. The discs are designed to minimize interference with the flow of tempering medium and preferably include openings through which the tempering medium may flow, such as serrations along the edges.

7 Claims, 6 Drawing Figures

METHOD AND APPARATUS FOR RESTRAINING GLASS DURING TEMPERING

BACKGROUND OF THE INVENTION

A technique commonly employed for tempering glass sheets, especially when a series of glass sheets are to be sequentially bend and then tempered, is to vertically hand each glass sheet from tongs which grip the upper marginal edge portion of each glass sheet and to thus convey each glass sheet through heating, bending, and tempering steps. The heating step entails suspending the glass sheets within a heating chamber until the temperature of the glass approaches its softening point, and then each sheet in series is conveyed out of the heating chamber and into a bending station. A typical vertical bending operation is disclosed in U.S. Pat. No. 3,367,764 to S. L. Seymour, wherein a heat-softened glass sheet is bent between a pair of complementary, horizontally reciprocated bending molds. After bending, with the glass sheet still at an elevated temperature sufficient for tempering, the glass sheet is conveyed into a quenching station where it is rapidly cooled by blasts of tempering medium so as to establish compressive stresses in the surface portions of the sheet, thereby strengthening the sheet. The tempering medium is usually air, but as used herein, the term may encompass any fluid capable of cooling a hot glass sheet. Such a process has proved to be an economical, high-speed method for mass producing bent and tempered glass sheets, such as those used for automobile glazing and the like.

One difficulty encountered with tempering glass sheets that are freely hung from tongs is that, when directing the blasts of tempering medium onto the glass sheets, it is usually found to be virtually impossible to precisely duplicate flow conditions on both sides of a curved glass sheet. As a result, sharp side-to-side buffeting of the glass sheet is often induced during quenching. This problem is made more difficult by the fact that it is usually necessary to provide relative motion between the glass sheets and the nozzles applying the tempering medium in order to avoid creating iridescent patterns in the glass due to uneven cooling. Buffeting of the glass sheets impedes uniform application of the tempering medium onto the glass sheets, which in turn leads to imbalanced stresses in the tempered product. Such uneven stresses can result in the tempered glass sheet failing to meet strength specifications and may even cause glass breakage during processng. The problem of buffeting is especially troublesome with thin glass (i.e., glass about 4.5 millimeters or less in thickness), the demand for which has been increasing for use in automobiles. Not only is thin glass lighter in weight and thus more susceptible to buffeting, but also the faster rates of cooling required to temper thin glass entail the use of higher pressure blasts of tempering medium, which in turn increases the amount of buffeting.

Efforts to reduce buffeting in the prior art have included the use of guide wires extending through a quenching apparatus, an example of which may be seen in U.S. Pat. No. 4,006,002 to Hetman. However, such an approach has not been found adequate to stabilize glass sheets in the quench to the extent desired. Moreover, prolonged contact between such guide wires and glass sheets may mar the glass surface in cases where the glass is still sufficiently softened, or may cause lines of distortion in the glass by absorbing heat at a rate different from the rate at which the remainder of the sheet is cooled.

Another prior art approach to limiting the degree of buffeting is disclosed in U.S. Pat. No. 3,824,090 to S. L. Seymour et al. In that arrangement a number of solid rollers are rigidly mounted on brackets attached to the quenching nozzles. However, the relatively large mass of the rollers and brackets serves as a heat sink, which can lead to undesirable non-uniform cooling of the glass. Also, the location of the rollers and brackets within the quenching zone renders adjustments to them very difficult when the apparatus is in use. Furthermore, in the arrangement in the patent, every mode of operation requires the rollers to roll continuously over extended areas of the glass surface.

SUMMARY OF THE INVENTION

In the present invention, buffeting of glass sheets hung vertically from tongs in the quenching section of a glass tempering operation is minimized by providing the quenching zone with a plurality of lightweight discs spaced apart on wires extending along one side of the position taken by a glass sheet in the quench. The pressure with which tempering medium is applied to the opposite sides of the glass sheets is controlled so as to force each glass sheet to one side into contact with the discs. Each disc provides minimal interference with the flow of the tempering medium and minimal heat absorption, and thus a large number of the discs may be used, thereby distributing the restraining force over a wide area.

Because the discs of the present invention are carried on wires which have resiliency in the transverse direction, the initial impact between the glass and the discs may be cushioned, and the wires tend to be forced to follow the curvature of the bent glass, thereby bringing more discs into contact with the glass surface and dividing the load among a greater number of contact points. Another advantage attained by the wire support arrangement of the present invention is that the ends of the wires can be supported outside the quench area itself, where they are readily accessible for making adjustments without the necessity of halting production. Additionally, this arrangement permits the support for the wires to be independent from the support means for the tempering nozzles. This permits a preferred, advantageously stable method of operation whereby the discs and the glass remain stationary with respect to one another while the nozzles are oscillated or reciprocated in any direction or mode.

THE DRAWINGS

DETAILED DESCRIPTION

Figure 1:
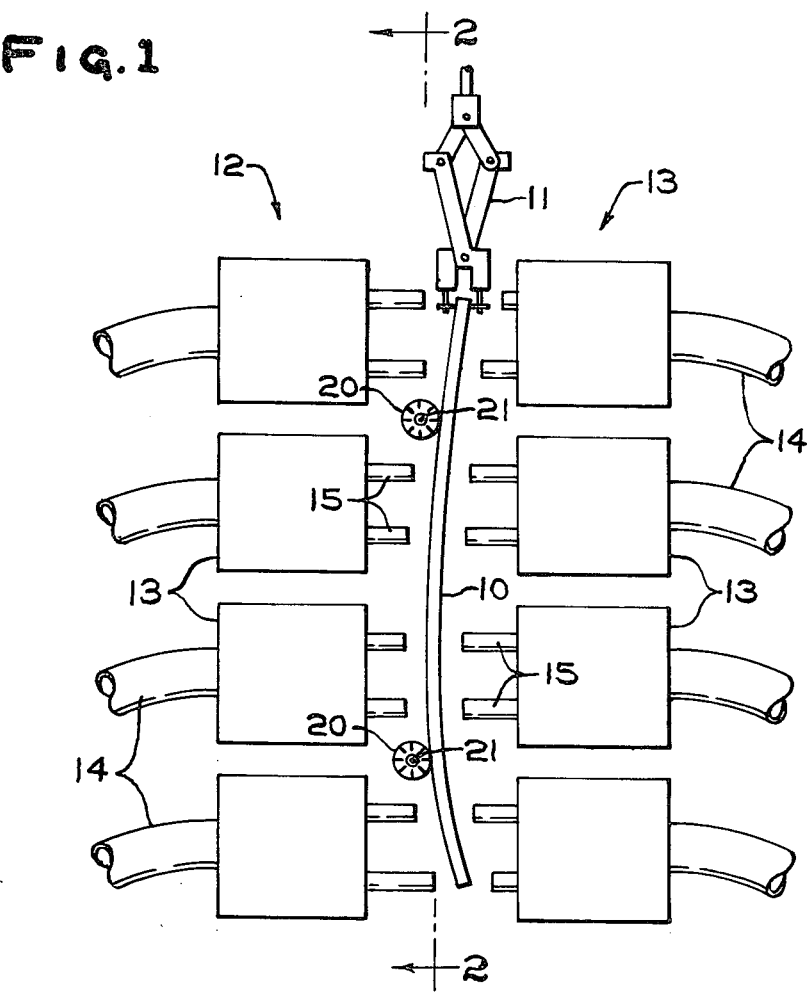
FIG. 1 is an end view of a quenching station of a glass sheet tempering operation depicting a preferred arrangement of the present invention.

In FIG. 1, a bent sheet of glass 10 is shown in an edgewise view being supported by tongs 11 within a quenching station. The glass sheet may be bent immediately prior to entering the quenching station by any of the well-known means for press bending vertically disposed glass sheets, for example, that shown in U.S. Pat. No. 3,367,764 to S. L. Seymour. Although only a single set of tongs can be seen in the drawing, the most common practice is to employ two or more sets of tongs to grip each glass sheet. The particular design of glass gripping tongs used is not essential to the present invention, but additional details of a preferred design may be found in U.S. Pat. No. 3,089,727 to W. J. Hay.

The present invention is not limited to any particular quench design, and thus the quench arrangement shown in the drawings is merely for the purpose of illustration. Any known quench design may be used which is capable of applying blasts of tempering medium (preferably air) onto opposite sides of a glass sheet. A specific embodiment which may be used to particular advantage with the present invention is disclosed in U.S. Patent Application Ser. No. 871,873, filed on Jan. 24, 1978, by V. R. Imler, the disclosure of which is hereby incorporated by reference. Other applications which may be referred to for improvements in the operation of that particular quench design are U.S. Patent Application Ser. Nos. 871,876 and 871,888, both filed on Jan. 24, 1978, by V. R. Imler, the disclosures of which are also incorporated by reference.

Immediately after being heated and bent, the still hot sheet of glass 10 is conveyed into a quenching station as shown in FIG. 1. There it is stopped between opposed blast heads 12 and 13 which direct tempering medium onto the opposite surfaces of the glass and quickly cool surface portions of the glass below the strain point of the glass so as to temper the glass. It is usually expedient to move the blast heads 12 and 13 to more widely spaced positions as the glass sheet is being conveyed into position in the quenching station and then, when the glass has stopped, to move the blast heads toward one another into close proximity to the glass as shown in FIG. 1. While the glass sheet is being conveyed into and out of the quenching station, it is usually desirable to cut off the flow of tempering medium.

Figure 2:
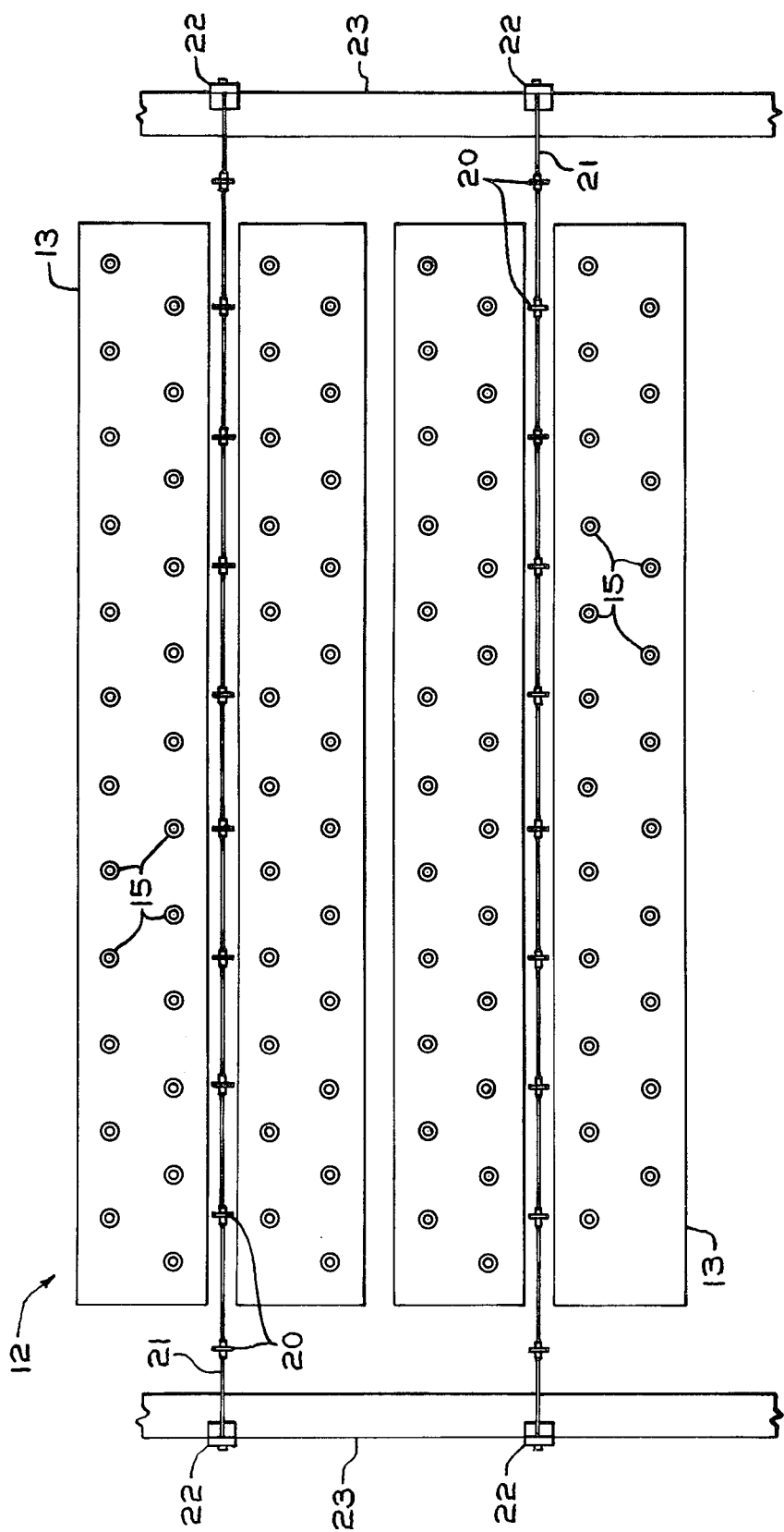
FIG. 2 is a side view of one side of the quenching station shown in FIG. 1 taken along lines 2—2 in FIG. 1.

As depicted in FIGS. 1 and 2, each blast head may consist of a number of modules 13, each of which is supplied with pressurized tempering medium by way of a conduit 14. The glass-facing side of each module 13 includes an array of nozzles 15 which direct air or other tempering medium toward the adjacent portion of the glass sheet. In order to avoid creating patterns of iridescence caused by unequal impingement of the tempering medium onto the glass surface, it is necessary to impart relative motion between the nozzles 15 and the glass. Such relative motion is usually achieved by reciprocating or rotating the blast heads in directions substantially parallel to the major glass surfaces. However, an alternate, preferred method of achieving relative motion with the present invention is to oscillate each quench module separately about a horizontal axis as disclosed in the aforesaid copending applications of Vaughn R. Imler.

In order to stabilize the glass sheet against the buffeting normally associated with the type of tempering operation which has been described, the present invention provides a pair of spaced-apart restraining wires 21 extending between the blasts heads and which carry a plurality of discs 20. The opposite ends of each wire 21 are fastened to mounting brackets 22 between which the wire is maintained taut. As shown in FIG. 2, the mounting brackets 22 may be located outside the area between the blast heads and may be adjustably fastened to a frame member 23. Frame member 23 may be either stationary and independent from the blast heads, or it may be part of the framework supporting the blast heads and thus travel in unison with the blast heads as they reciprocate.

The term "wire" as used herein is intended to include any thin, flexible, elongated thread, cord, filament, or the like. The wire should be capable of maintaining strength while being exposed periodically to elevated temperatures, and should be able to withstand some abrasion. Thus, the wire is preferably made of metal such as steel (e.g., piano wire).

The discs 20 carried on each wire serve to space the surface of the glass sheet from the wires, thereby preventing contact between the wires and the hot glass and reducing undesirable thermal effects. In the preferred embodiment, the discs 20 take the form of thin, circular pieces of heat-resistant material 24, each having a plurality of serrations 25 for improving circulation of tempering medium in the vicinity of each disc. A material found to be particularly suitable for this purpose is "Synthane" grade G-7, an electrical insulator material sold by the Synthane Taylor Company of Valley Forge, Pennsylvania, and which is believed to be a fiber glass reinforced epoxy resin. A thickness of about 3 millimeters and a diameter of about 2 to about 4 centimeters have been found to be satisfactory. Other materials which may be used for the circular portions of the discs include boron nitride, Teflon (polytetrafluoride plastics sold by DuPont Co.) or the like, and wood (particularly maple). In order to maintain the flat, circular portion of each disc perpendicular to the wire, a short piece of a small diameter metal tube 26 may be inserted through the center of the thin, circular portion and adhered in place by a temperature resistant adhesive, such as an epoxy type adhesive. The tube 26 is selected to have an inner bore 27 of a diameter slightly greater than the diameter of the wires 21 so that a wire may be inserted through each bore 27 with sufficient clearance for each disc to rotate. The spacing between discs will be determined largely by the curvature of the bent glass sheets. A typical spacing between discs is about 30 centimeters.

The ability of the discs to rotate on the wires is an advantage when the blast leads and the wires reciprocate vertically as a unit, whereby the discs roll over the surface of the glass and avoid abrasive contact between the wires and the glass surface. In other modes of operation, however, the rotational feature may not be essential, in which case the discs may be rigidly affixed to the wire such as by gluing, welding, or crimping the tube 26. If the discs are rigidly affixed to the wire, the wires may extend through the quenching station in directions other than the horizontal direction shown in the drawings. Another variation, which would permit rotation of the discs while preventing their displacement along the wire, would be to affix small retainer clips on either or both sides of each disc, thereby preventing the discs from sliding along the wires.

Figure 3:
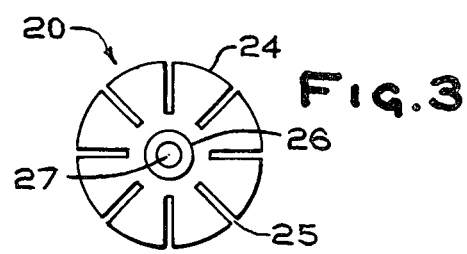
FIG. 3 is an enlarged view of a preferred form of serrated disc which may be used in the practice of the present invention.
Figure 4:
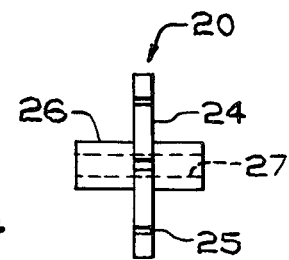
FIG. 4 is a side view of the serrated disc shown in FIG. 3.
Figure 5:
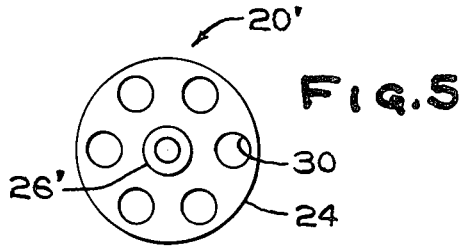
FIG. 5 is an enlarged view of an alternative form of disc having holes instead of serrations.
Figure 6:
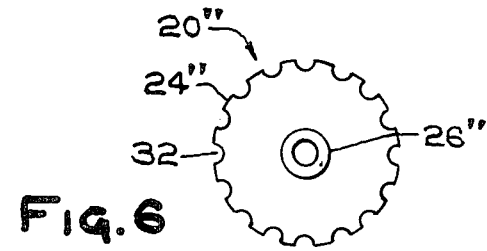
FIG. 6 is an enlarged view of another alternate form of disc having edge notches.

While some of the advantages of the present invention may be attained when using discs having solid circular portions, it is preferred that the discs have serrations or other type of perforations in order to avoid dead spots in the flow of tempering medium adjacent to the glass surface. The preferred embodiment is to provide perforations in the form of radially extending serrations 25 as shwon in FIG. 3, since such an arrangement permits flow through a large area of each disc including both the outer edge portions and central portions. Examples of alternate arrangements for providing flow through the discs are shown in FIGS. 5 and 6. In FIG. 5, disc 20' has a flat circular portion 24' and a central hub 26', as in the preferred embodiment, but is provided with a plurality of drilled holes 30 through the flat, circular portion. It should be apparent that openings of any shape could be cut instead of the circular openings shown. In FIG. 6, disc 20" is likewise provided with a flat circular portion 24" and a central hub 26". The air flow openings in this case take the form of indentations 32 around the perimeter of the flat, circular portion in a pattern resembling gear teeth.

In operation, a vertically hanging glass sheet 10 is conveyed into the quenching area along either a horizontal or vertical path while the blast heads 12 and 13 are in their open, horizontally separated positions, at which time the wires 20 are also laterally retracted from the path of glass travel. The glass is oriented so as to place its convex side toward the wires 21 and discs 20. When the glass has stopped in the quench, the blast heads are moved closer together to bring the nozzles 15 and the wires 21 into closer proximity to the glass, whereby some of the discs 20 closely approach or contact the convex side of the glass sheet. The flow of pressurized tempering medium is then initiated and the relative pressures on opposite sides of the glass sheet are maintained so as to force the convex side of the glass sheet into contact with several of the discs along each wire. At a given applied pressure, the generated lateral force on the concave side of the glass sheet will be greater than that on the convex side. Thus, urging the glass sheet against the discs does not necessarily require higher pressure to be supplied to the blast head on the concave side.

While blasts of tempering medium are being applied onto the glass sheet, relative motion between the nozzles and the glass may be provided in any of a number of ways, the choice of which will depend upon a number of factors such as the shape of the glass sheet being tempered and the design of the particular blast heads being employed. In some cases, individually oscillating quench modules 13 have been found to be preferred, as disclosed in the aforementioned copending patent applications of V. R. Imler. When such a quench module arrangement is employed in connection with the present invention, the glass and the wires advantageously may both remain stationary while the quench modules oscillate. In other cases, when each blast head moves as a whole, it is preferred that relative motion be provided by reciprocating each blast head vertically while the glass remains stationary. In the latter case, the wires may move in unison with the blast head on the convex side, whereby the discs roll over the convex surface of the glass sheet. Other modes which may be utilized advantageously with the present invention include reciprocating the blast heads horizontally in the longitudinal direction while the glass and the wires remain stationary, or rotating the blast heads about a horizontal transverse axis while the glass and the wires remain stationary. Also, if the wires run vertically through the quench, the blast heads and the wires may be reciprocated together in the horizontal, longitudinal direction so as to roll the discs over the surface of the glass.

When tempering is completed, the flow of tempering medium is stopped, the blast heads separate, the wires are retracted from the path of glass travel, and the glass sheet is conveyed out of the quench station to an unloading station.

Other variations and modifications as are known to those of skill in the art may be resorted to within the spirit and scope of the present invention as defined by the appended claims.

I claim:

1. Apparatus for tempering glass sheets vertically hung from tongs comprising:
   a pair of opposed blast heads flanking a vertically extending glass sheet receiving space, each blast head including an array of nozzles extending toward said glass sheet receiving space and adapted to direct streams of fluid tempering medium toward opposite major surfaces of a glass sheet vertically hung in said space, means for supplying pressurized tempering medium to the blast heads, restraining wires extending along one side of the glass sheet receiving space in front of said nozzles and adapted to limit the extent to which the glass sheet swings to one side, a plurality of spaced-apart discs carried on and radially projecting from each of the restraining wires so as to space the glass sheet from the restraining wires, and means for providing relative motion between said nozzles and the glass sheet.

2. The apparatus of claim 1 wherein said discs have perforations permitting the flow of tempering medium therethrough.

3. The apparatus of claim 2 wherein the edges of said discs are serrated.

4. The apparatus of claim 3 wherein each disc is comprised of a tubular hub inserted axially through a flat, circular member, and the restraining wires pass through the hubs.

5. The apparatus of claim 4 wherein the discs are free to rotate on the wires.

6. The apparatus of claim 5 wherein the restraining wires extend substantially horizontally between the blast heads.

7. A method of tempering glass sheets, comprising:
   vertically suspended a glass sheet from glass-gripping tongs, heating the glass sheet to a temperature suitable for tempering, applying blasts of tempering medium onto opposite sides of the glass sheet so as to rapidly cool surface portions of the glass sheet, and controlling the application of the tempering medium so as to force the glass sheet to one side into contact with a plurality of spaced apart discs carried on a pair of flexible wires extending through the blasting area and mounted with sufficient resiliency to allow a plurality of the discs on each wire to come into contact with the glass sheet, thereby distributing the force of contact among a plurality of contact points and providing cushioned lateral restraint against buffeting of the glass sheet.

* * * * *